(12) United States Patent
Jennings et al.

(10) Patent No.: US 7,577,498 B2
(45) Date of Patent: *Aug. 18, 2009

(54) APPARATUS AND METHODS FOR A ROBOTIC BEVERAGE SERVER

(75) Inventors: Craig Jennings, Dayton, OH (US); Mike Katchmar, Troy, OH (US); Zane A. Michael, Troy, OH (US); Ron Potter, Springboro, OH (US)

(73) Assignee: Motoman, Inc., West Carrollton, OH (US)

( * ) Notice: Subject to any disclaimer, the term of this patent is extended or adjusted under 35 U.S.C. 154(b) by 283 days.

This patent is subject to a terminal disclaimer.

(21) Appl. No.: 11/517,182

(22) Filed: Sep. 7, 2006

(65) Prior Publication Data

US 2007/0106422 A1    May 10, 2007

Related U.S. Application Data

(63) Continuation-in-part of application No. 11/210,244, filed on Aug. 23, 2005.

(51) Int. Cl.
*G06F 19/00* (2006.01)

(52) U.S. Cl. .................. 700/245; 700/258; 700/259; 435/286.2; 435/287.2; 435/287.3; 435/289.1; 435/306.1; 141/100; 422/63; 422/65; 422/99; 222/129.1

(58) Field of Classification Search .............. 700/245; 222/129.1
See application file for complete search history.

(56) References Cited

U.S. PATENT DOCUMENTS

| 3,067,912 | A | 12/1962 | Neri et al. |
|---|---|---|---|
| 3,409,176 | A | 11/1968 | Krause |
| 3,830,405 | A | 8/1974 | Jaeger |
| 3,949,902 | A | 4/1976 | Thompson |
| 4,628,974 | A | 12/1986 | Meyer |
| 4,922,435 | A | 5/1990 | Cahlander et al. |
| 5,074,741 | A | 12/1991 | Johansson |
| 5,363,885 | A | 11/1994 | McConnell et al. |

(Continued)

OTHER PUBLICATIONS

Maxwell et al., Alfred: The Robot Waiter Who Remembers You, 1999, Internet, p. 1-12.*

(Continued)

*Primary Examiner*—Khoi Tran
*Assistant Examiner*—Marc McDieunel
(74) *Attorney, Agent, or Firm*—Dinmsore & Shohl LLP

(57) ABSTRACT

A robotic beverage server that includes a robot, a beverage dispenser in fluid communication with a plurality of beverages contained within respective beverage storage receptacles and operable to dispense one or more of the beverages from the respective storage receptacles, and a controller to operate the robot to pick a container and move the container to the beverage dispenser and to operate the beverage dispenser to dispense one or more of the beverages from the storage receptacles into the container and transport the container to a user. A method of preparing a beverage or mixture of beverages that includes picking a container using a robot, moving the container to an automatic beverage dispenser, wherein the beverage dispenser is in fluid communication with and operable to dispense a plurality of beverages contained within a plurality of storage receptacles, dispensing a beverage into the container from the storage receptacles via the automatic beverage dispenser and delivering the container to a user.

20 Claims, 5 Drawing Sheets

U.S. PATENT DOCUMENTS

| | | | |
|---|---|---|---|
| 5,941,416 A * | 8/1999 | Balz et al. ............... | 222/1 |
| 6,014,221 A | 1/2000 | Plude, Jr. | |
| D456,080 S | 4/2002 | Karlsson | |
| 7,289,883 B2 | 10/2007 | Wang et al. | |
| 2004/0088077 A1 | 5/2004 | Jouppi et al. | |

OTHER PUBLICATIONS

News product and services, Fluid dispensing via robots, 2003, Internet, p. 6.*

Bartending, TS-7405, Federal Wage System Job Grading Standard for Bartending, 7405, 1974, Internet, p. 1-4.*

Motoman Inc, TJMPO to Sell Motoman's Robobar, Robotic Bartending Solutions, 2006, internet, p. 1-2.*

Motoman News Release, Motoman's New Robobar Robotic Bar Tender Serves Drinks, 2004, Internte, p. 1.*

Copending U.S. Appl. No. 29/236,900, filed Aug. 23, 2005, Jennings et al.

Copending U.S. Appl. No. 29/236,889, filed Aug. 23, 2005, Jennings et al.

Copending U.S. Appl. No. 11/210,244, filed Aug. 23, 2005, Jennings et al.

Copending U.S. Appl. No. 11/210,249, filed Aug. 23, 2005, Jennings et al.

Hwang et al, "Design of a SPDM-Like Robotic Manipulator System for Space Station on Orbit Replaceable Unit Ground Testing—An Overview of the System Architecture," 1994, IEEE, p. 1286-1291.

* cited by examiner

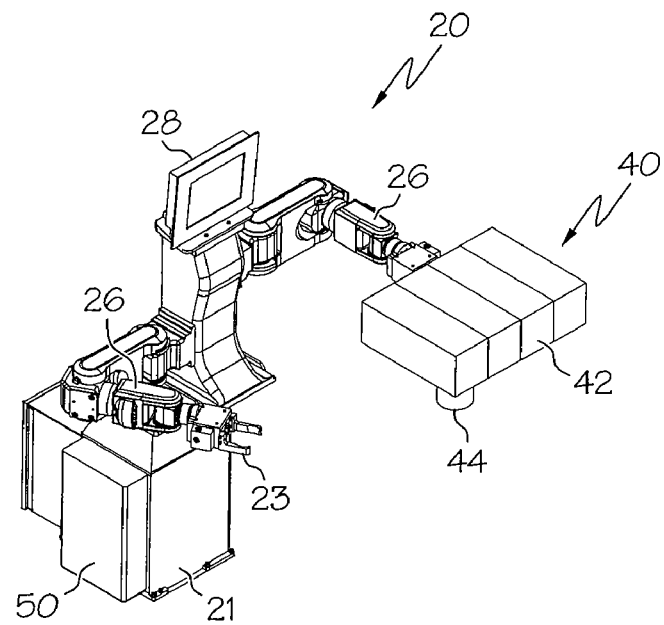
FIG. 2A
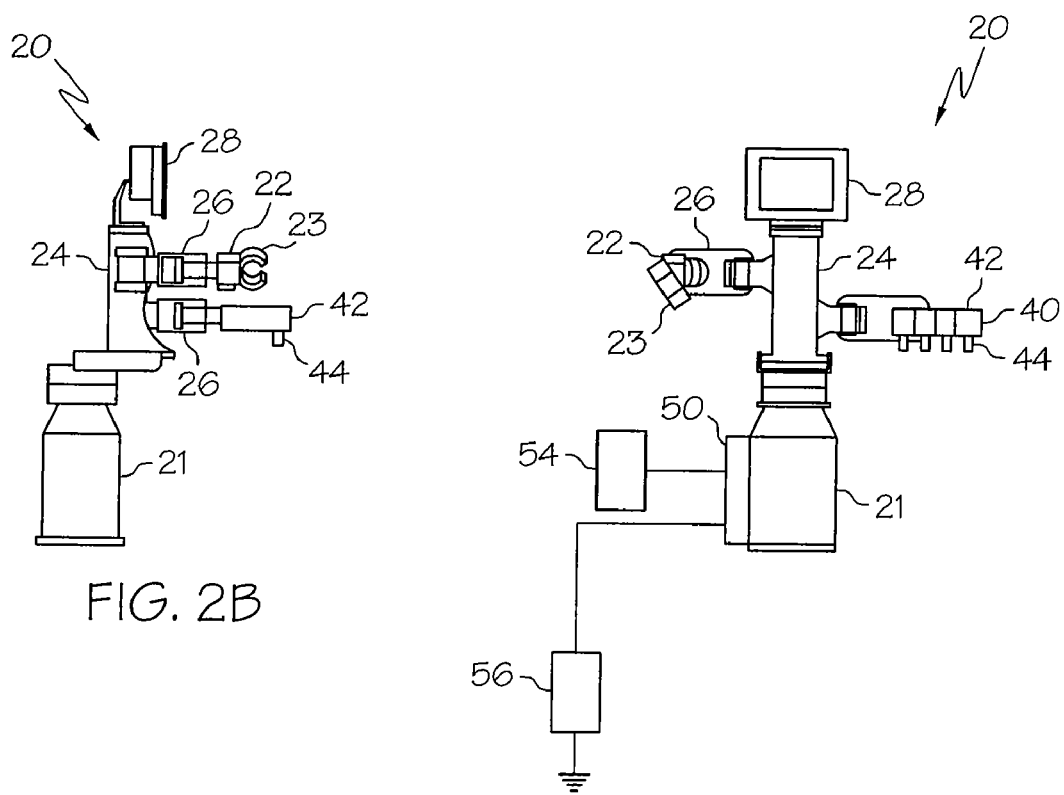
FIG. 2B
FIG. 2C

APPARATUS AND METHODS FOR A ROBOTIC BEVERAGE SERVER

CROSS REFERENCE TO RELATED APPLICATIONS

This application claims the benefit of U.S. Provisional Application No. 60/690,566 filed Jun. 14, 2005, and is a continuation-in-part of U.S. Non-provisional application Ser. No. 11/210,244 filed Aug. 23, 2005, which are both herein incorporated by reference.

FIELD OF THE INVENTION

The present invention relates to automatic beverage servers, more particularly to apparatus and methods for robotic beverage servers operable to take beverage orders and/or prepare, dispense, serve, deliver, and/or transport a beverage or mixture of beverages to a user in response to such beverage order.

BACKGROUND OF THE INVENTION

Many commercial establishments such as bars, restaurants, and casinos offer a variety of beverages, including mixtures of beverages, for their patrons to consume. Typically, these establishments use human bartenders to perform the task of preparing and serving these beverages. Although using a human bartender has its benefits, there are also many issues as well. For example, in this line of work, there tends to be a high level of turnover. This turnover adds costs to the operation due to frequently having to spend large amounts of time and money recruiting and re-training individuals.

Anytime a business employs people, it also must deal with employee performance issues such as poor attendance, tardiness, sub-par performance, and a variety of other issues. Management ends up spending extensive amounts of time dealing with these employee issues, which ends up taking management's time away from other critical items such as operational matters and the customer. Having employees also adds substantial cost to an operation due to having to pay employee salaries, benefits, training, and other ancillary costs associated with having employees.

These type of commercial establishments also are constantly looking for a gimmick or niche to attract and entertain customers. The establishments want to create some unique identifier for their business that sets them apart from the rest of their competitors. It is desired to find something that draws customers to their establishment over a competitor's.

There is a need for improved apparatus and methods for taking beverage orders and/or preparing, dispensing, and/or serving the beverages to a user.

SUMMARY OF THE INVENTION

Accordingly, the present invention is intended to address and obviate problems and shortcomings and otherwise improve previous robotic beverage servers.

One exemplary embodiment of the present invention is a robotic beverage server that includes a robot, a beverage dispenser in fluid communication with a plurality of beverages contained within respective beverage storage receptacles and operable to dispense one or more of the plurality of beverages from the respective beverage storage receptacles, and a controller. The controller is programmed to operate the robot to pick a container and to move the container to the beverage dispenser. The controller is further programmed to operate the beverage dispenser to dispense one or more of the plurality of beverages from the beverage storage receptacles into the container and to transport the container containing the dispensed beverage or mixture of beverages to a position where the user may receive the container.

Another exemplary embodiment of the present invention is a robotic beverage server a robot including at least one robotic arm, a container supply for holding a plurality of containers, an automatic beverage dispenser in fluid communication with a plurality of beverages contained within respective beverage storage receptacles, and a controller. The controller is programmed to operate the robot to pick a container from the container supply using the at least one robotic arm and to move the container to the beverage dispenser. The controller is further programmed to operate the beverage dispenser to dispense a beverage or mixture of beverages from the beverage storage receptacles into the container and to transport the prepared beverage or mixture of beverages to a position where the user may receive the container.

An exemplary method of the present invention is a method of preparing a beverage or mixture of beverages that includes picking a container from a container supply using a robot, moving the container from the container supply to an automatic beverage dispenser, wherein the beverage dispenser is in fluid communication with and operable to dispense a plurality of beverages contained within a plurality of beverage storage receptacles, dispensing a beverage or mixture of beverages into the container from one or more of the plurality of beverage storage receptacles via the automatic beverage dispenser, and delivering the container holding the beverage or mixture of beverages to a point where a user may receive the container.

BRIEF DESCRIPTION OF THE DRAWINGS

The following detailed description of the preferred embodiments of the present invention can be best understood when read in conjunction with the following drawings, where like structure is indicated with like reference numerals and in which:

FIG. 2A is a perspective view of an exemplary embodiment of a robot of the exemplary robotic beverage server shown in FIG. 1;

FIG. 2B is a side elevational view of the exemplary robot shown in FIG. 2A;

FIG. 2*c* is a front view of the exemplary robot shown in FIG. 2A;

DETAILED DESCRIPTION OF THE INVENTION

Figure 1:
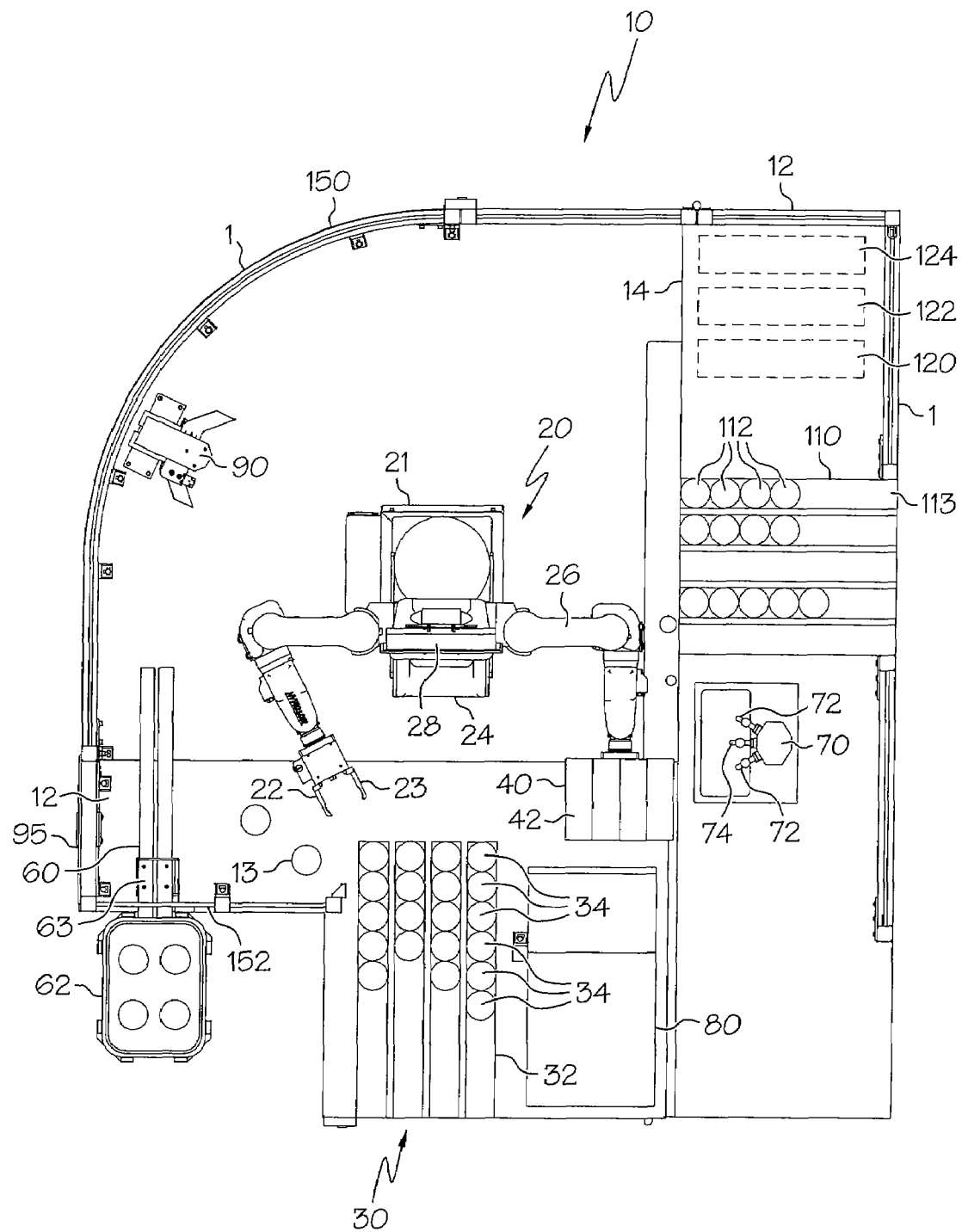
FIG. 1 is a top plan view of an exemplary embodiment of a robotic beverage server according to the present invention.

The present invention may include apparatus and methods configured to provide a high production or high speed robotic beverage server capable of dispensing one or more beverages or mixtures of beverages in a fast and efficient manner. Referring now to FIGS. 1-2C, an exemplary embodiment of a robotic beverage server of the present invention is shown as 10. Robotic beverage server 10 generally may include a robot 20, a beverage dispenser 40, and a framework 1 substantially encompassing the robot. Robotic beverage server 10 may optionally include one or more of the following additional components: a vertical container storage device 13, a beverage container supply 30, a barrier 150 substantially encompassing the other components of robotic beverage server 10 (e.g., robot 20, beverage dispenser 40, etc.), a second beverage dispenser 70, an ice machine 80, a beverage bottle cap remover 90, a beverage delivery mechanism 60 for transporting the dispensed beverages from the robot to a user outside barrier 150, a beverage bottle supply 110, and a user selection interface 95. FIG. 1 shows robotic beverage server 10 including these components for illustration purposes only, and not limitation.

Robotic beverage server 10 of this embodiment may dispense (e.g., dispense, prepare, and/or deliver) a variety of single beverages or mixtures of beverages, including but not limited to liquor, spirits, mixed drinks/cocktails, shots, wine, bottled or draft beer, malted beverages, sodas, carbonated beverages, frozen drinks, teas, juices, water, soda water, tonic water, coffees, cappuccinos, lattes, combinations thereof, and any other type of beverage as known to one of ordinary skill in the art. As used herein, the term "dispense" is defined as the pouring, dispensing, preparing, and/or delivering of a beverage(s) or a mixture(s) of beverages to a user.

FIGS. 2A-2C show an exemplary embodiment of robot 20 of the present invention. Robot 20 may comprise any robot commonly known in the art, including but not limited to commercially available robots (e.g., industrial articulated arms, human-like robots, etc.) and/or custom manufactured systems. In one exemplary embodiment, robot 20 is configured to approximate a physical representation of a human body. It is understood that robot 20 may comprise a variety of shapes, forms, and components to approximate a physical representation of a human body. For example, robot 20 may comprise one or more components that have a very mechanical appearance, yet still permit the robot to approximate a physical appearance of a human body, e.g., having a head, torso, and/or one or more arms. In another example, robot 20 may comprise components, including an outer shell, that have a very realistic human appearance to approximate a physical representation of a human body. It is understood that robot 20 may include components that approximate legs, hands, eyes, ears, and/or any other part of the human body.

In the exemplary embodiment shown in FIGS. 2A-2C, robot 20 is configured to approximate a physical representation of a human body by including a torso 24, head 28, and arms 26. When combined, the torso, head, and arms provide robot 20 this human-like appearance. Robot 20 approximates a physical representation of a human body, even though robot 20 has a very mechanical and/or robotic appearance. Head 28, which in this exemplary embodiment is a multi-pixel display panel, is connected to a top part of torso 24. Two robotic arms 26 are connected to opposite sides of torso 24 to represent arms of a human. Also, robot 20 includes base 21 which is disposed along the ground and connected to torso 24, opposite the head. Robot 20 (e.g., head 28, torso 24, and arms 26) may rotate 360 degrees relative to base 21 in order to cooperate with, pick, or operate any of the items and/or devices of robotic beverage server 10, including items/devices along counter top 12 and/or framework 1.

Each arm 26 may move along and/or about multiple axes. For example, arms 26 of the exemplary embodiment may move along and/or about 5 axes. In addition, robotic arms 26 may include a gripper 22 for gripping items (e.g., a beverage container 34 or a beverage bottle 112) or for activating items such as beverage dispenser 70 if necessary. Any conventional robot gripping device as known to one of ordinary skill in the art may be used with robot 20 without departing from the spirit and scope of the present invention. In the exemplary embodiment, one robotic arm 26 includes a gripper 22 and one robotic arm 26 includes beverage dispenser 40 (described below). As shown, gripper 22 includes two actuated fingers 23 that are parallel to each other. When operated, fingers 23 move either inwardly towards each other or outwardly away from each other in a substantially parallel orientation. Gripper 22 may be connected to and controlled by the robot's servo control system or a separate pneumatic control system. In one exemplary embodiment, gripper 22 has a separate pneumatic control system with its own power supply and controller (e.g., microprocessor).

As set forth above, head 28 may comprise a display panel to exemplify a human-head as shown in FIG. 2. Display panel 28 may be any known conventional and/or commercially available display panel without departing from the scope of the present invention. In the exemplary embodiment, display panel 28 is a multi-pixel display panel, including but not limited to a television and/or monitor. Exemplary display panels may comprise a LCD monitor, plasma screen monitor, a flat panel screen, a television, any other television and/or monitor as known to one of ordinary skill in the art.

The robot of the exemplary embodiment is commercially available from MOTOMAN, Inc., of West Carrollton, Ohio (hereinafter "MOTOMAN"), a subsidiary of YASKAWA Electric America, Inc., of Oakbrook, Ill. In an alternative embodiment, robot 20 may be a single articulated robotic arm capable of multi-axis movement, for example, a six-axis robotic arm. Such articulated, robotic arms are also commercially available from several commercial suppliers such as MOTOMAN, Inc., West Carrollton, Ohio.

As shown in FIG. 2C, a robotic controller 50 is in electrical communication with robot 20 and may include any conventional input control device 54 for programming controller 50, including but not limited to a programming pendant (e.g., a teach pendant). Generally, controllers 50 are separate and located a distance from the robot. However, in the exemplary embodiment of the present invention, controller 50 is located within base 21 of robot 20 to improve the footprint of robotic beverage server 10, thus saving valuable floor space. Input control device 54 may be used to input programming and/or other control instructions to control and/or operate robot 20 and any of the other components of robotic beverage server 10 (e.g., program beverage dispensers 40 and/or beverage dispenser 70 to dispense a beverage or mixture of beverages automatically) as known to one of ordinary skill in the art.

Input control device 54 and/or controller 50 may include a WINDOWS operating program (e.g., WINDOWS CE), a programming language, and/or a PC architecture. Any conventional robotic programming language and PC architecture as known to one of ordinary skill in the art may be used with the present invention. The programming language would be well understood by one skilled in the art and need not be described in detail herein. In an alternative embodiment of the present invention, the programming language may comprise the INFORM series of programming languages that are commercially available from MOTOMAN, Inc., West Carrollton, Ohio. Also, controller 50 and/or robot 20 may be connected to a power supply 56. Power supply 56 may be any conventional power supply such as those used in the robotic arts as known to one of ordinary skill in the art.

Robotic beverage server 10 may also include a computer (not shown) that contains system programming that interfaces with the controller 50, input control device 54, and its robotic control and/or other robotic beverage server control programming. The computer may be configured to send, retrieve, and collect control signals and data. The computer and/or robotic beverage server 10 may be connected to other systems and/or networks such as a LAN, WLAN, or the Internet via standard hardwire connections or wireless communications (e.g., WIFI), allowing data to be collected and aggregated from one or more robotic beverage servers on-site or remotely. Memory may be connected to or included with controller 50 and/or the computer. The memory may be used to store data such as display (e.g., graphic or textual representations) or sound (e.g., voice) data, inventory data, accounting data, sales data, and/or revenue data. The memory may be any conventional memory as known to one of ordinary skill in the art.

Robotic beverage server 10 may also include a user selection interface 95. User selection interface 95 may comprise any device capable of permitting a user (e.g., consumer or server) to interface with robotic beverage server 10. For example, in the exemplary embodiment, user selection interface 95 comprises a touch screen that permits a user to input or enter a beverage or mixture of beverages order into robotic beverage server 10, thus causing robotic beverage server 10 to begin dispensing the beverage order. The touch screen may be any conventional touch screen panel as known to one of ordinary skill in the art. User selection interface 95 may also comprise devices such as computers (laptop, desktop, personal digital assistants, etc.).

User selection interface 95 may be configured to display or list the available beverages or mixture of beverages that robotic beverage server 10 is capable of dispensing. Such user selection interface may be connected to controller 50 and/or a computer via hard-wired or wireless connections and may send signals to controller 50 based upon user input (via touch screen). For example, a server may enter a consumer beverage order by touching an icon representing the specific beverage desired by the consumer on touch screen 95. Controller 50 (and/or the computer) may receive the order and is programmed to respond to such order by sending control signals to robot 20 and/or the other beverage server components (e.g., beverage dispenser 40) to begin dispensing the ordered beverage.

Robotic beverage server 10 (e.g., the controller or a computer) may also calculate and display the total cost due for the consumer's beverage order on user selection interface 95 and/or display panel 80. User selection interface 95 may also be configured to allow a user to enter a credit card or account number to pay for the charges. Robotic beverage server 10 may be connected to point-of-service magnetic card readers in order to permit a user to pay for the ordered beverages by swiping a magnetic strip card (e.g., prepaid account cards, debit cards, credit cards, etc.). Robotic beverage server 10 may be programmed to debit the entered account or card for the amount of the beverage order. Interface 95 may display the total charges for the ordered beverages and include a touch icon for the consumer to accept or approve the charged amount to be charged to the account the consumer provided. Robotic beverage server 10 may comprise a kiosk (not shown) that contains user selection interface 95 (e.g., touch screen).

The robotic beverage server of the present invention may also include a wireless receiver/transceiver (not shown) that is in communication with a wireless handheld device such as a personal data assistant (not shown). Alternatively, the robotic beverage server may have a docking station that a handheld device may connect to, placing the handheld device in communication with the robotic beverage server. In an alternative exemplary embodiment, a server (waiter/waitress) when taking the consumer's order may enter the beverage order into the handheld device, and then may wirelessly transmit or dock the handheld device to communicate the order to the robotic beverage server. The robotic beverage server may begin dispensing the ordered beverages without having to wait for the waiter/waitress to travel back to the robotic beverage server. Thus, this system may reduce the time a consumer has to wait for their drinks. In many cases, by the time the waiter/waitress arrives at the robotic beverage server station, the ordered drinks have already been dispensed and are waiting for the waiter to pick them up.

In addition, display panel 28 is in communication with controller 50 and may be configured to display a variety of graphic and/or textual representations thereon based upon display data transmitted from either a computer or controller 50 in response to a user selection. For example, controller 50 (and/or a computer) may be configured to permit a user to select the gender (e.g., male or female) of the robot or his or her favorite celebrity (e.g., movie star, sports star, etc.) and/or fictional character (e.g., cartoon character, book character, etc.) and then display this selected image or graphic representation on display panel 28 (i.e., head 28). Such image may be an actual video of the selected person, character, etc., or may be an animated and/or manipulated video or cartoon of such person, character, etc. In addition, beverage server 10 may be configured to transmit via speakers (not shown) a gender specific voice or the actual or a similar sounding voice of the user selected character. Such oral transmissions may be used to cause the robot to communicate with the user (e.g., consumer or server).

Controller 50 (and/or a computer) may also be programmed to use the display panel 28 to display user (e.g., consumer, operator, or server messages). For example, the display panel 28 may display messages describing to a user (e.g., a customer, operator, or server) what stage of the operation the robotic beverage server is currently performing such as "Now retrieving ice", "Now pouring liquor", "Now retrieving Mixer", "Mixing drink", and/or "Drink now served". It is understood that a variety of other textual or oral messages may be transmitted from the robotic beverage server to communicate to a user (e.g., a consumer, operator, or server). Controller 50 (and/or a computer) may also be configured to advertise drink specials or consumer/operator warnings and alerts either visually on display panel 28 and/or orally via connected speakers. It is understood that robotic beverage server 10 may use any conventional speakers to transmit the variety of oral messages, verbal interactions, songs, and/or other sounds.

Referring back to FIG. 1, beverage dispenser 40 may comprise any beverage dispenser as known to one of ordinary skill in the art, including but not limited to automatic beverage dispensing towers, automatic dispensing guns, manual beverage dispensing towers, manual dispensing guns, beer taps connected to kegs, beer/wine taps or dispensers, slushy machines, frozen beverage dispensers, coffee (including latte and/or espresso) dispensers, combinations thereof, or any other conventional beverage dispensers. Beverage dispenser 40 may be in fluid communication with a plurality of beverages from a plurality of beverage storage receptacles (e.g., 120, 122, 124, etc.). Beverage dispenser 40 may use a presurized system such as a carbon dioxide system to pump to the beverages from the plurality of beverage storage receptacles to an outlet (e.g., outlet 44) on beverage dispenser 40.

One exemplary embodiment of beverage dispenser 40 comprises one or more, four (4) in the exemplary embodiment shown, beverage dispensing guns 42 connected to one of the robotic arms (26) and in fluid communication with a plurality of beverages contained within the plurality of respective beverage storage receptacles (e.g., 120, 122, 124, etc.). Beverage dispenser 40 and/or beverage dispensing guns 42 may dispense and beverage storage receptacles (e.g., 120, 122, 124, etc.) may contain a variety of beverages, including but not limited to liquor, spirits, mixed drinks/cocktails, shots, wine, bottled or draft beer, malted beverages, sodas, carbonated beverages, frozen drinks, juices, teas, water, soda water, tonic water, coffees, cappuccinos, lattes, combinations thereof, and any other type of beverage as known to one of ordinary skill in the art. In one exemplary embodiment, each gun 42 is connected to sixteen (16) different beverages (and/or ingredients), thus providing robotic beverage server 10 at least sixty-four (64) (4 guns×16 available beverages) different beverage combinations available to be dispensed from beverage dispensing guns 42.

"Automatic", as used herein, is defined as requiring no manual manipulation in order to operate such as, for example, automatic beverage dispensing guns require no manual manipulation by robot 20 in order for them to dispense beverages. Rather, the controller is programmed to cause the automatic beverage guns to dispense the beverages. In the exemplary embodiment, controller 50 is configured (e.g., programmed) to automatically operate one or more of dispensing guns 42 to dispense any beverage or mixture of beverages available from the sixty-four (64) beverages contained within the plurality of beverage storage receptacles (e.g., 120, 122, 124) based upon a received beverage order entered into user selection interface 95.

Beverage dispenser 40 may include solenoid valves (not shown) connected in fluid communication between the plurality of beverage storage receptacles (e.g., 120, 122, 124, etc.) and outlet 44 on beverage dispensing guns 42. Controller 50 may be configured (e.g., programmed) to open the valves based upon the amount of time required for robot 20 to pick a container 34 from container supply 30 and place it under one of the outlets (44) and then close the valves after an amount of time has transpired sufficient to permit the necessary volume of beverage(s) or mixture(s) of beverages to be dispensed from dispensing guns 42 into the container. In an alternative embodiment, each beverage dispensing gun 42 may include a sensor that is configured to detect a container 34 under its outlet 44 and then, once detected, dispense the beverage or mixture of beverages that have been entered into the robotic beverage server via user selection interface 95 by a server or consumer.

In the exemplary embodiment, robotic beverage server 10 also includes an optional beverage dispenser 70 disposed along a tower extending from countertop 12 in addition to beverage dispensing guns 42. Beverage dispenser 70 may also be in fluid communication with one or more beverages contained within the beverage storage receptacles (e.g., 120, 122, 124, etc.). In one exemplary embodiment, dispenser 70 is in fluid communication with only beer and wine contained within the storage receptacles. For example, dispenser 70 may include two outlets 72 connected in fluid communication to beer contained within the storage receptacles and one outlet 74 connected in fluid communication to wine contained within the storage receptacles.

However, it is understood that dispenser 70 may be configured similar to or the same as dispensing guns 42 such that dispenser 70 may be in fluid communication with a plurality of beverages contained within the storage receptacles in order to dispense a plurality of beverages or mixtures of beverages, including but not limited to liquor, spirits, mixed drinks/cocktails, shots, wine, bottled or draft beer, malted beverages, sodas, carbonated beverages, frozen drinks, juices, tea, water, soda water, tonic water, coffees, cappuccinos, lattes, combinations thereof, and any other type of beverage as known to one of ordinary skill in the art. For example, a single dispenser 70 may be capable of dispensing sixteen (16) beverages (i.e., ingredients) similar to the exemplary each of the dispensing guns 42 described herein. A tower may be configured to comprise one or more dispensers 70 to increase the number of beverages or mixtures of beverages that may be dispensed from robotic beverage server 10. Beverage dispenser 70 may be automatic or manual as described herein and known to one of ordinary skill in the art.

Still referring to FIGS. 1-2C, as set forth above, robotic beverage server 10 may include framework 1, which is designed to look substantially like a bar. Framework 1 may be fabricated from a variety of materials, including but not limited to metals, plastics, woods, composite materials, and combinations thereof. The materials used to fabricate framework 1 may be materials that are light in weight for ease in transporting robotic beverage server 10, yet provide strength to the structure of the robotic beverage server 10 as known to one of ordinary skill in the art.

Framework 1 may include a structural frame (not shown), countertops 12 connected to the frame, and panels (not shown) enclosing the frame to form storage cabinets 14 underneath countertops 12. The panels may be opaque, clear, painted, tinted, or any combination thereof. In this particular embodiment, framework 1 is made from aluminum. In addition, in one exemplary embodiment, countertop 12 is fabricated from stainless steel for sanity purposes. In one alternative embodiment, a portion of cabinets 14 are refrigeration units, wherein the plurality of storage receptacles (e.g., 120, 122, 124, etc.) may be stored and kept cooled. Another portion of the cabinets may contain inventory such as beverage containers and any other supplies.

Barrier 150 may be integral to framework 1 or a separate piece connected on top of framework 1. Barrier 150 provides a cage or structure to prevent persons from reaching or climbing over countertop 12 and/or the lower portion of framework 1. Barrier 150 may be fabricated from a variety of materials and in a variety of configurations as known to one of ordinary skill in the art, including but not limited to metal bars, fencing, plastics such as transparent plastics (e.g., PLEXIGLAS), etc. In the exemplary embodiment shown, barrier 150 is a series of windows that, in combination with framework 1, completely enclose robotic beverage server 10, preventing unauthorized access to or interference with robotic beverage server 10 and its operation. This barrier also may prevent persons from injury due to getting hit by robot 20. Barrier 150 may also prevent theft, vandalism, or unauthorized access to the robotic beverage server's supplies (e.g., alcohol). Framework 1 and barrier 150 may include a door (not shown), allowing access to the inside of robotic beverage server 10.

Barrier 150 may also include an opening 152, wherein beverage delivery mechanism 60 may transport completed, i.e., dispensed, beverages on tray 62 through barrier 150 in order for a user to retrieve the ordered beverage(s). Opening 152 may be permanently open or a closeable access point such as via a sliding window. If opening 152 includes a sliding window, it may be manually or automatically opened and closed. If automatic, it may be controlled via controller 50 and with the use of programming and/or sensors as known to one of ordinary skill in the art (e.g., programmed to open and close depending upon whether serving tray 62 is inside barrier 150 or outside barrier 150). Such an opening may be servo or pneumatic-controlled and operated.

As set forth above, robotic beverage server 10 may also include beverage delivery mechanism 60 in order to transport one or more beverage containers 34 that now contain a dispensed beverage(s) or mixture(s) of beverages from robot 20 to a user standing outside barrier 150. One exemplary embodiment includes a conveyor 63 operable to transport a serving tray 62 between a point inside barrier 150 to a point either outside barrier 150 (as shown in FIG. 1) or a point along an outer edge of countertop 12. In one exemplary embodiment, tray 62 is fixed to conveyor 63. In an alternative exemplary embodiment, serving tray 62 may be removable from conveyor 63 such that a server may pick up the tray and carry all the dispensed beverages on the tray to a consumer. Conveyor 63 may be connected to controller 50 or to its own control network. It may be, for example, servo or pneumatic-controlled and operated as known to one of ordinary skill in the art.

In the exemplary embodiment shown, robotic beverage server 10 may also include conventional vertical stack beverage container storage devices 13. The container storage devices 13 may store a variety of conventional containers (e.g., glasses, cups, etc.) as known to one of ordinary skill in the art in a vertically-stacked arrangement. Beverage container storage device 13 may comprise a container dispenser commonly found in concession-type stands, i.e., a spring-loaded cup dispenser, wherein a plurality of drinking cups are stacked upside down into the dispenser. As each cup is pulled from the dispenser, the dispenser is spring-loaded and thus pushes the stack of cups upward such that the next cup is exposed and available for dispensing. Such a beverage container dispenser is known to one of ordinary skill in the art and need not be described in detail herein. Beverage container storage device 13 may be attached to framework 70 such that the beverage containers are protruding through countertop 12.

Still referring to FIG. 1, as set forth above, robotic beverage server 10 may include a beverage container supply 30 and a bottled beverage supply 110. In one exemplary embodiment, both, beverage container supply 30 and bottle beverage supply 110, may comprise conveyors 32 and 113, respectively, configured to receive beverage containers 34 and bottles 112, respectively, and then to transport or assist in the transportation of the containers and bottles from outside the perimeter of framework 1 and/or barrier 150 to inside the perimeter of the framework and/or barrier such that robot 20 may pick the containers and bottles from the container supply 30 and bottled beverage supply 110, respectively.

Alternatively, beverage container supply 30 and bottled beverage supply 110 may include shelves that comprise roller bearings configured to receive the containers 34 and bottles 112. The roller bearings permit the containers and bottles to slide effortlessly across the roller bearings from outside the perimeter of framework 1 and barrier 150 to inside the perimeter of the framework and barrier such that robot 20 may pick the containers and bottles from the container supply 30 and bottled beverage supply 110, respectively. It is understood that these are exemplary embodiments of container supply 30 and beverage supply 110 and that a variety of other devices and methods may be used with robotic beverage supply 10 to supply containers and bottled beverages to users as known to one of ordinary skill in the art.

Robotic beverage server 10 may also include an ice dispenser 80. Ice dispenser 80 may be any conventional or yet-to-be developed ice dispensing machine as known to one of ordinary skill in the art. Generally, ice dispenser 80 may include a storage receptacle (not shown) that holds the ice until it is dispensed and a dispensing apparatus (not shown) that, upon its activation, dispenses the ice from the storage receptacle into a beverage container. In an alternative embodiment, the ice dispenser 80 may include an ice making device (not shown) as known to one of ordinary skill in the art. Again, the ice making device is well known to those skilled in the art and need not be described in detail herein.

Figure 3:
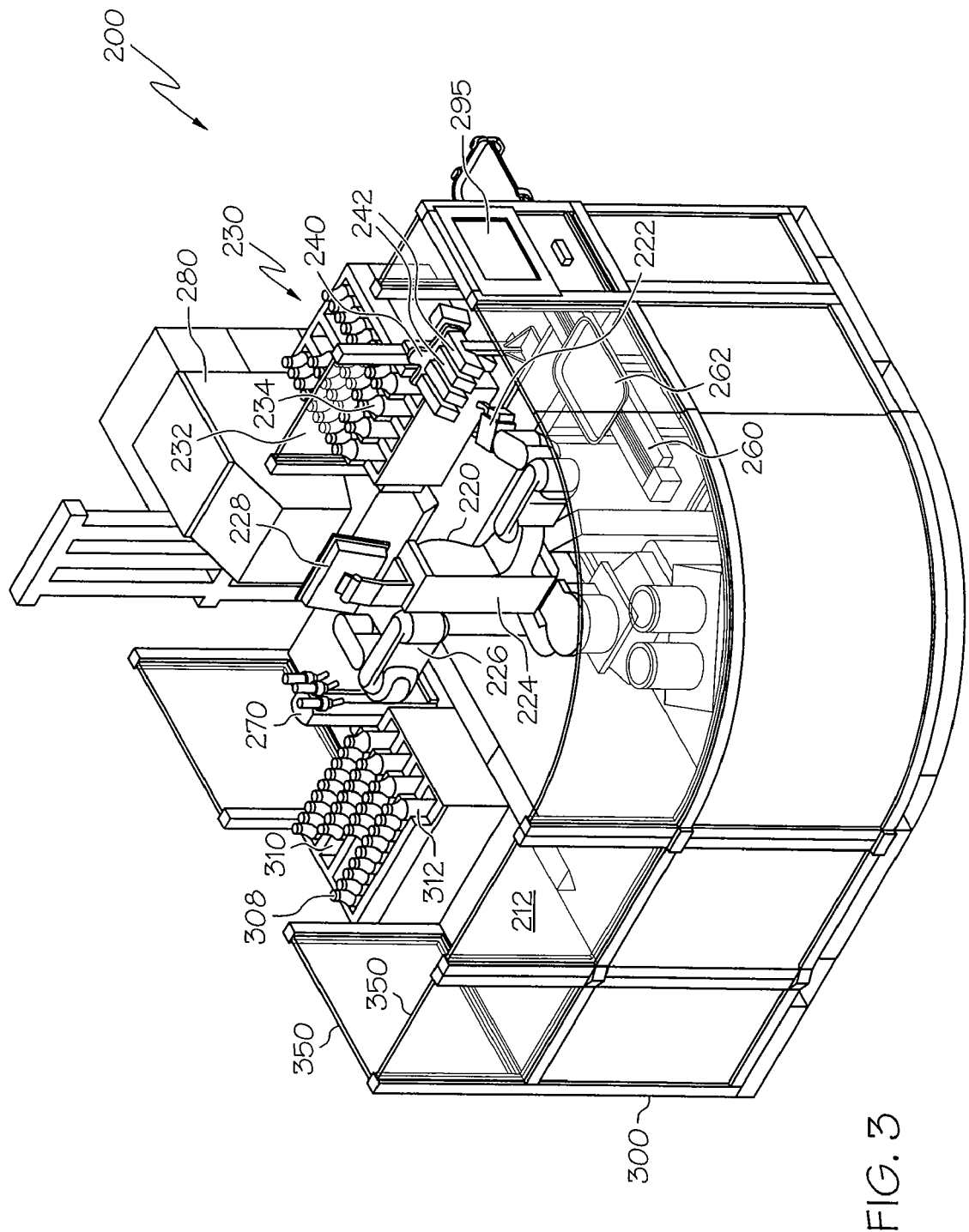
FIG. 3 is a perspective view of an exemplary embodiment of a robotic beverage server according to the present invention.
Figure 4:
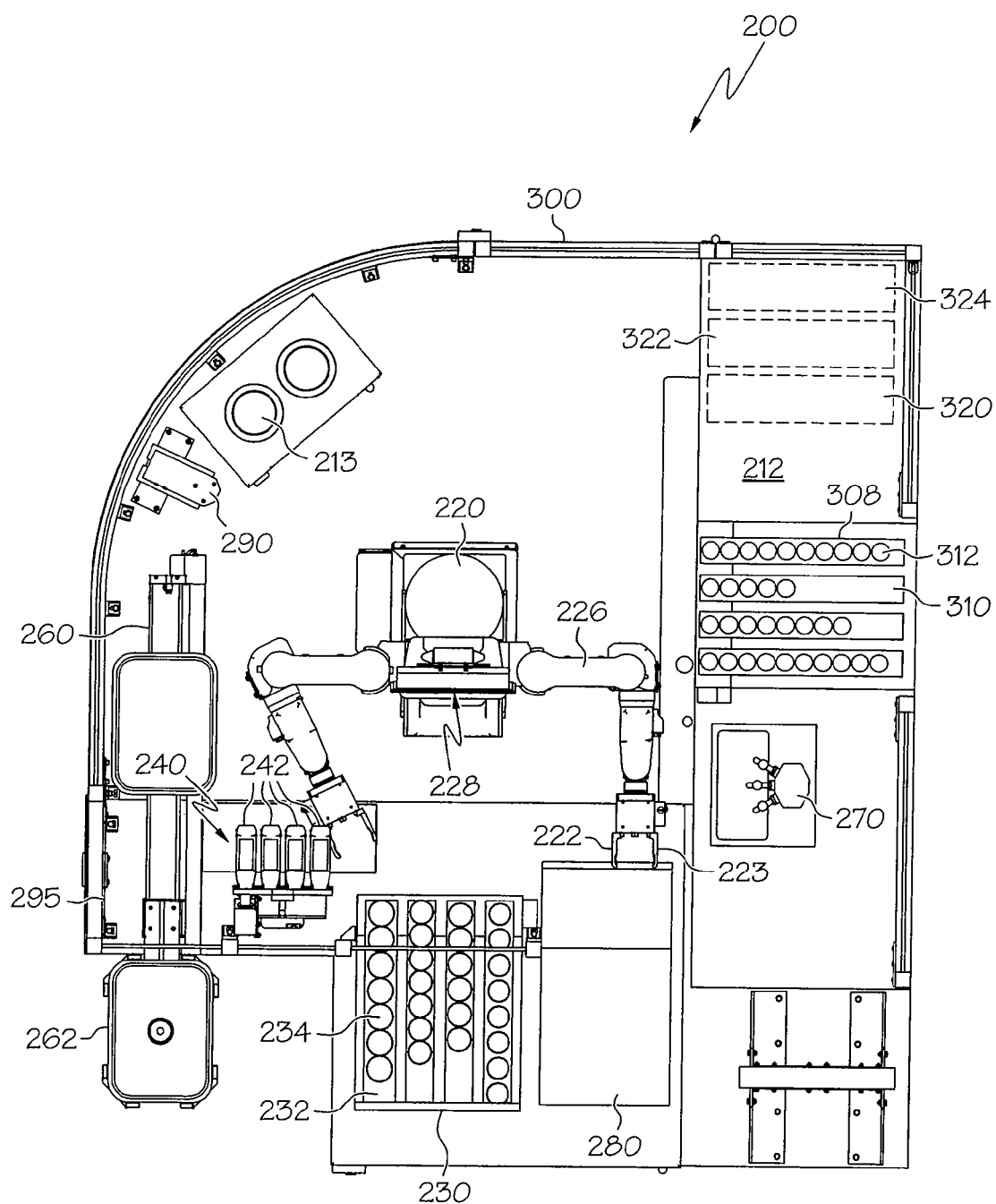
FIG. 4 is a top plan view of the exemplary robotic beverage server shown in FIG. 3.

Referring to FIGS. 3-4, an alternative embodiment, of a robotic beverage server is shown as 200. Robotic beverage server 200 may include a robot 220 and a beverage dispenser 240. In addition, robotic beverage server 200 of this exemplary embodiment, may include any and or all of the components and functions as described for robotic beverage server 10 above herein and shown in FIGS. 1-2C. For example, as shown, robotic beverage server 200 also includes a framework 300 and a barrier 350 that combined may substantially encompass the robot and other components of robotic beverage server 200. Robotic beverage server 200 may also include a second beverage dispenser 270 for dispensing beer and wine, an ice machine 280, a beverage bottle cap remover 290, a beverage delivery mechanism 260 for transporting the dispensed beverages from the robot to a user outside barrier 350, a beverage bottle supply 308, a beverage container supply 230, a controller (not shown), and a user selection interface 295. All of which have been described above herein and thus need not be described again.

In the exemplary embodiment shown, beverage dispenser 240 comprises one or more beverage dispensing towers 242. The beverage towers are disposed along counter top 212. Robot 220 includes two robotic arms 226 attached to a torso 224 opposite each other. Robot 220 includes a gripper 222 connected to each arm 226 such that robot 220 may pick a container 234 with each gripper and then dispense a beverage or mixture of beverages via dispensing tower 240 into each container 234, either separately or simultaneously.

Beverage dispenser 240, in the exemplary embodiment shown in FIGS. 3 and 4 comprises four (4) dispensers 242 disposed on a tower to form a dispensing tower. Beverage dispensers 242 may be in fluid communication with a plurality of beverages (e.g., liquor, spirits, mixed drinks/cocktails, shots, wine, bottled or draft beer, malted beverages, sodas, carbonated beverages, frozen drinks, juices, tea, water, soda water, tonic water, coffees, cappuccinos, lattes, combinations thereof, and any other type of beverage as known to one of ordinary skill in the art) that are contained within storage receptacles (e.g., 320, 322, 324, etc.). Dispensers 242 may dispense one or more of the plurality of beverages or mixture of the plurality of beverages from the storage receptacles. In one exemplary embodiment, each dispenser 242 may dispense sixteen (16) different beverages (i.e., ingredients), thus providing the robotic beverage server 200 the capability to dispense at least sixty-four (64) different beverages. Beverage dispenser 242 may be connected to a controller (not shown), which may be the same as or similar to controller 50 as described above herein. Dispenser 242 may also be connected to solenoid valves (not shown) that are programmed to operate based upon programmed times as described above or be connected to a controller and sensors (not shown), as described above herein, to dispense beverages based upon sensing container 234 under an outlet of the dispensers.

It is understood that the robotic beverage servers of the present invention (e.g., server 10 and server 200) may comprise any number of variety and combinations of beverage dispensers (e.g., 40, 70, 242) and that the beverage dispensers shown and described herein are just exemplary embodiments. Both the beverage dispensing guns 42 and beverage dispensers 70 and 242 may be connected to the plurality of beverage storage receptacles via conventional distribution lines and/or a manifold system (not shown) as known to one of ordinary skill in the art.

Figure 5:
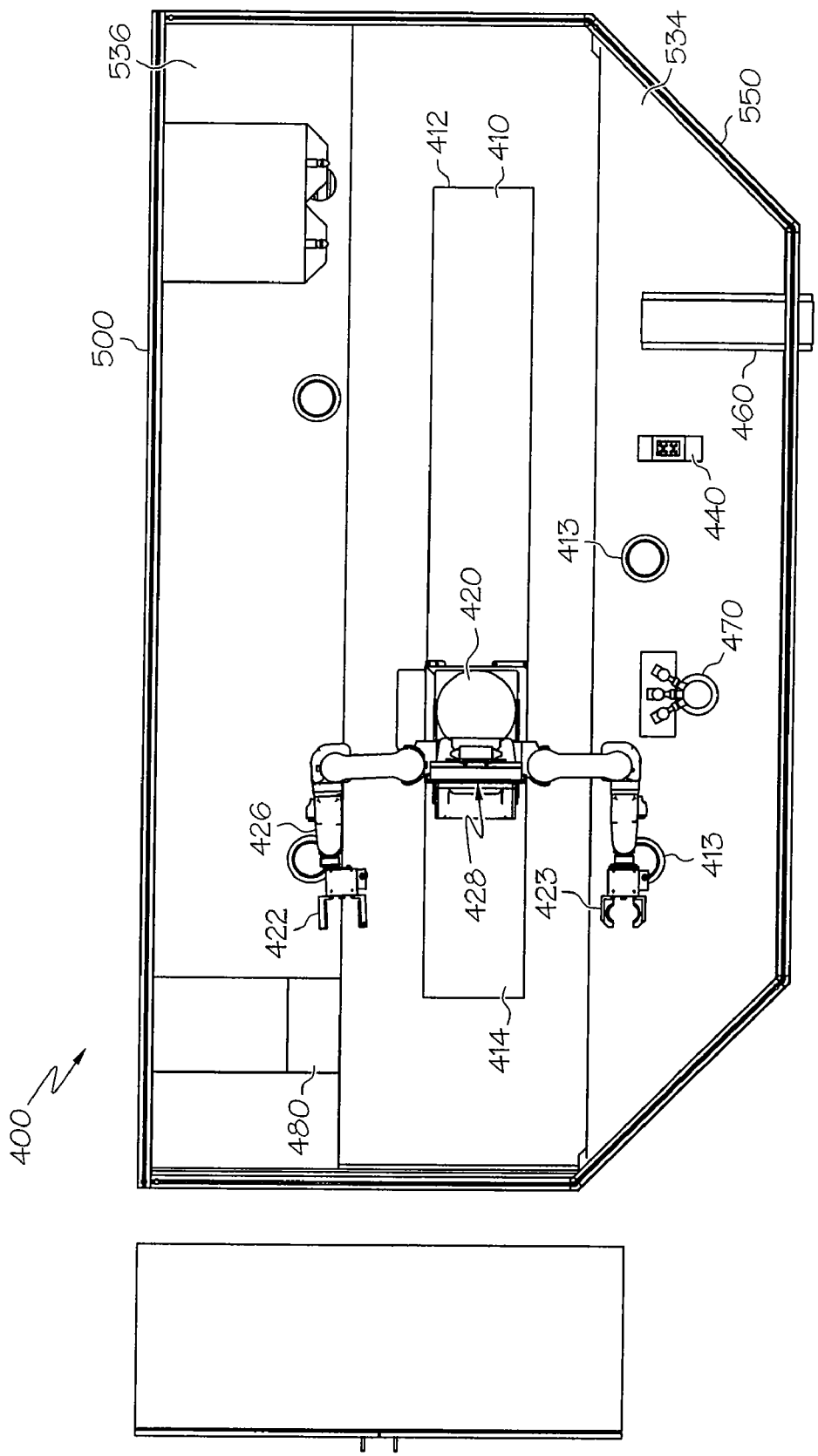
FIG. 5 is a top plan view of an exemplary embodiment of a robotic beverage server according to the present invention.

Referring now to FIG. 5, another alternative embodiment of the robotic beverage server is shown generally as 400. This embodiment of the robotic beverage server 400 is designed to also dispense beverages or mixtures of beverages at a high rate of speed. The layout of the robotic beverage server is designed as one embodiment to optimize the preparation and serving of beverages. Server 400 generally comprises a linear track 410 having a first end 412 and a second end 414, a robot 420, a beverage dispenser 440, and a framework 500 encompassing and supporting the other components of the robotic beverage server. In addition, robotic beverage server 400 may include any and or all of the components and functions as described above herein for robotic beverage servers 10 and 200 and shown in FIGS. 1-2C and 3-4, respectively. For example, as shown, robotic beverage server 400 also includes a barrier 550 substantially encompassing the other components of robotic beverage server 400 (e.g., robot 420) and extending upward from framework 500, a second beverage dispenser 470 for dispensing additional beverages, an ice machine 480, a beverage delivery mechanism 460 for transporting the dispensed beverages from the robot to a user outside barrier 550, a beverage container vertical storage device 413, a controller (not shown), and a user selection interface (not shown). All of which have been described above herein and thus need not be described again.

Robot 420 is movably attached to the track 410 such that the robot 420 may move quickly between first end 412, second end 414, and/or any position there between while dispensing (preparing, dispensing, serving, and/or delivering) ordered beverages. Robotic beverage server 400 of this embodiment may dispense a variety of beverages and/or mixture of beverages, including but not limited to liquor, spirits, mixed drinks/cocktails, shots, wine, bottled or draft beer, malted beverages, sodas, carbonated beverages, frozen drinks, juices, water, soda water, tonic water, coffees, cappuccinos, lattes, combinations thereof, and any other type of beverage as known to one of ordinary skill in the art. Framework 500 may include a front countertop 534 and a back countertop 536 running parallel to the track 410 on opposite sides from each other. It is understood that the location of the different components of robotic beverage server 400 may be arranged in a variety of configurations in order to optimize the speed at which server 400 may dispense the particular variety of beverages available for dispensing. The controller in this embodiment may include programming to perform any and/or all functions for dispensing beverages or mixtures of beverages and/or ice at a rate of high speed.

In still another alternative embodiment of the high speed server 400, the framework comprises one countertop (e.g., 534) located on one side of the track 410 such that all the components of the server are positioned side-by-side along one side of the robot. This lay-out allows for the robot 420 to move up and down the track 410 between its two ends 412, 414 to each component in a relatively quick manner.

Although particular embodiments have been described and shown above, it is understood that the robotic beverage server and its components could be positioned in a variety of other designs without departing from the scope of the present invention. Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed:

1. Robotic beverage server, comprising:
    a robot including at least one robotic arm having at least three degrees of motion;
    a container supply for holding a plurality of containers disposed adjacent to the robot such that the at least one robotic arm is operable to pick one of the plurality of container;
    a plurality of beverage storage receptacles containing a plurality of beverages;
    an automatic beverage dispenser in fluid communication with the plurality of beverage storage receptacles;
    a beverage delivery device disposed adjacent to said robot; and
    a controller in communication with the robot and the automatic beverage dispenser and programmed to operate
        the at least one robotic arm to pick a container from the container supply and to move the container from the container supply to the beverage dispenser,
        the beverage dispenser to dispense a beverage or mixture of beverages from the beverage storage receptacles into the container,
        the at least one robotic arm to transport the container from the beverage dispenser to the beverage delivery device, and
        the beverage delivery device to transport the prepared beverage or mixture of beverages held in the container to a position where the user may receive the container.

2. The robotic beverage server according to claim 1, wherein the robotic beverage server is operable to dispense a beverage or mixture of beverages in the container to a user in less than or equal to about 20 seconds.

3. The robotic beverage server according to claim 1, wherein the robotic beverage server is operable to dispense a beverage or mixture of beverages in the container to a user in less than or equal to about 10 seconds.

4. The robotic beverage server according to claim 1, wherein the robot comprises a first robotic arm and a second robotic arm, and wherein the controller is programmed to operate the robot to pick a first container and a second container with respective first and second robotic arms and to move the first and second containers to the beverage dispenser, to operate the beverage dispenser to dispense beverages or mixtures of beverages from the beverage storage receptacles into first and second containers, to operate the first and second robotic arms to move the first and second containers from the beverage dispenser to the beverage delivery device, and to operate the beverage delivery device to transport the first and second containers containing the dispensed beverages or mixtures of beverages to a position where a user may receive first and second containers.

5. The robotic beverage server according to claim 4, wherein the controller is programmed to perform the tasks of claim 4 substantially simultaneously.

6. The robotic beverage server according to claim 1, wherein the robotic beverage server is operable to dispense a first beverage or mixture of beverages and a second beverage or mixture of beverages in respective first and second containers to a user in an amount of time less than or equal to about 30 seconds.

7. The robotic beverage server according to claim 6, wherein the amount of time is less than or equal to about 20 seconds.

8. The robotic beverage server according to claim 1, wherein the beverage delivery device is a conveyor for transporting the container including the dispensed beverage or mixture of beverages to a position where a user may receive the container.

9. The robotic beverage server according to claim 1, wherein the container supply comprises a conveyor for transporting the containers.

10. The robotic beverage server according to claim 1, further comprising a user selection interface comprising a display connected to the controller;
    wherein the user selection interface presents to a user a plurality of beverage and mixture of beverages choices on the display;
    wherein the controller responds to a user selection by dispensing and delivering the corresponding beverage or mixture of beverages selected by the user.

11. The robotic beverage server according to claim 1, wherein the beverage dispenser dispenses a mixture of beverages comprising a liquor beverage and a second beverage into a single container without the robot having to pick a liquor bottle or to pick a mixed drink shaker container in order to dispense the mixture of beverages.

12. The robotic beverage server according to claim 1, wherein the robot is configured to approximate a physical representation of a human body comprising a torso, a head, and multiple robotic arms, the head comprising a display panel connected on top of the torso; and
    wherein the controller is programmed to transmit display data to the display panel.

13. The robotic beverage server according to claim 12, wherein the display data is a gender specific image.

14. The robotic beverage server according to claim 13, wherein the controller is programmed to transmit a gender specific voice corresponding to the displayed gender specific image to communicate to and with a user.

15. The robotic beverage server according to claim 1, further comprising a multi-pixel display panel configured to display graphic or textual representations thereon, the display panel is positioned upon the robot to approximate a physical representation of a human head.

16. A robotic beverage server according to claim 15, further comprising:
    memory configured to store the graphic or textual representations; and
    a user selection interface connected to the controller, wherein the user selection interface presents to a user a plurality of graphic or textual representations available for selection by the user;
    wherein the controller responds to a user selection by displaying the selected graphic or textual representations stored within the memory on the display panel while dispensing and delivering the beverage or mixture of beverages.

17. The robotic beverage server according to claim 1, further comprising a bottled beverage supply for storing a plurality of bottled beverages, wherein the controller is programmed to operate the robot to pick a bottled beverage from the bottled beverage supply, and to operate the robotic beverage server to remove a cap from the bottled beverage.

18. The robotic beverage server according to claim 1, further comprising a framework and barrier, wherein the framework and barrier at least partially encompass the robot and the beverage dispenser.

19. The robotic beverage server according to claim 1, wherein the beverage dispenser is mounted to the at least one robotic arm of the robot and is capable of dispensing a plurality of beverages or mixture of beverages.

20. A method of preparing a beverage or mixture of beverages, comprising:
    picking a container from a container supply using a robotic arm having at least three degrees of motion;
    moving the container from the container supply to an automatic beverage dispenser using the robotic arm, wherein the beverage dispenser is in fluid communication with and operable to dispense a plurality of beverages contained within a plurality of beverage storage receptacles;
    automatically dispensing a beverage or mixture of beverages into the container from one or more of the plurality of beverage storage receptacles via the automatic beverage dispenser; and
    delivering the container holding the beverage or mixture of beverages using a beverage delivery device to a point where a user may receive the container.

* * * * *

UNITED STATES PATENT AND TRADEMARK OFFICE
CERTIFICATE OF CORRECTION

PATENT NO. : 7,577,498 B2 Page 1 of 1
APPLICATION NO. : 11/517182
DATED : August 18, 2009
INVENTOR(S) : Jennings et al.

It is certified that error appears in the above-identified patent and that said Letters Patent is hereby corrected as shown below:

Col. 13, Line 11 claim 10 "beverages" should read --beverage--.

Signed and Sealed this

Third Day of August, 2010

David J. Kappos
*Director of the United States Patent and Trademark Office*